US012162677B2

(12) United States Patent
Stark et al.

(10) Patent No.: US 12,162,677 B2
(45) Date of Patent: Dec. 10, 2024

(54) BAG DISPENSER

(71) Applicant: Ryan Stark, Phoenix, AZ (US)

(72) Inventors: Ryan Stark, Phoenix, AZ (US); Bryan Falk, Chandler, AZ (US)

(73) Assignee: Ryan Stark, Phoenix, AZ (US)

( * ) Notice: Subject to any disclaimer, the term of this patent is extended or adjusted under 35 U.S.C. 154(b) by 81 days.

(21) Appl. No.: 17/725,218

(22) Filed: Apr. 20, 2022

(65) Prior Publication Data

US 2022/0332497 A1 Oct. 20, 2022

Related U.S. Application Data

(60) Provisional application No. 63/177,136, filed on Apr. 20, 2021.

(51) Int. Cl.
*B65F 1/06* (2006.01)
*B65D 83/08* (2006.01)
*B65D 85/671* (2006.01)

(52) U.S. Cl.
CPC .............. *B65F 1/062* (2013.01); *B65D 83/08* (2013.01); *B65D 85/671* (2013.01)

(58) Field of Classification Search
CPC ................ A47K 10/36; A47K 10/3637; A47K 2010/3675; A47K 2010/3693; B65D 83/08; B65D 85/671; B65F 1/062
See application file for complete search history.

(56) References Cited

U.S. PATENT DOCUMENTS

| | | | | | |
|---|---|---|---|---|---|
| 663,051 | A * | 12/1900 | Tobey | B41L 11/00 | 101/132.5 |
| 2,535,748 | A * | 12/1950 | Morgenstern | D06F 45/18 | 68/269 R |
| 3,354,823 | A * | 11/1967 | Lake | B41F 31/04 | 222/103 |
| 5,301,834 | A * | 4/1994 | Lee | B65H 3/523 | 221/241 |
| 5,346,476 | A * | 9/1994 | Elson | A61M 5/148 | 604/246 |
| 5,425,513 | A | 6/1995 | Shainker | | |
| D394,571 | S * | 5/1998 | King | D3/215 | |
| 5,766,351 | A * | 6/1998 | Lin | B05C 1/12 | 118/244 |
| 6,427,839 | B1 | 8/2002 | Helfer-Grand | | |
| 6,550,635 | B1 * | 4/2003 | King | A47K 10/42 | 221/33 |
| 6,725,753 | B2 * | 4/2004 | Bell | B26D 7/025 | 225/93 |
| 7,997,522 | B2 * | 8/2011 | Titas | A47K 10/3818 | 242/615.3 |
| 2005/0263087 | A1 | 12/2005 | Livingston | | |
| 2009/0266853 | A1 | 10/2009 | Bianchi | | |
| 2011/0132952 | A1 | 6/2011 | Peterson-Malesci | | |
| 2011/0272442 | A1 | 11/2011 | Che | | |
| 2018/0280554 | A1 * | 10/2018 | Khajavi | A61L 2/10 | |

* cited by examiner

*Primary Examiner* — Gene O Crawford
*Assistant Examiner* — Kelvin L Randall, Jr.
(74) *Attorney, Agent, or Firm* — AVEK IP, LLC

(57) ABSTRACT

Disclosed is a bag dispenser that has a clam-shell arrangement including a hood, base, and also has a mounting system. A bag-dispensing mouth of the system has two opposing members that create resistance when bags (e.g., rolled bags) are pulled out through the mouth. The resistance is adjustable using a cam that can be locked in a variety of positions. The cam engages a drive bar to create the resistance.

15 Claims, 13 Drawing Sheets

BAG DISPENSER

CROSS-REFERENCE TO RELATED APPLICATIONS

This application claims the benefit of U.S. Provisional Application No. 63/177,136 filed Apr. 20, 2021, the entire contents of which are herein incorporated by reference.

BACKGROUND OF THE INVENTION

1. Field

The disclosed embodiments relate generally to the field of systems and methods for dispensing waste bags.

2. Description of the Related Art

In the commercial cleaning industry, many workers are required to remove an existing trash bag including waste, and replace the bag with a new trash liner. Conventionally, these workers often carry the replacement bags around in the packaging in which they were purchased. Trash bag packs typically come in the form of perforated or nonperforated rolls, and include the bag rolls in apron pockets or rest the bags on or in cleaning carts so that they can carry the bags with them as they work. A typical approach to dispensing is executed by unrolling a single bag, and then where the roll is perforated, tearing that bag from the next bag in the roll.

Some bag-dispensing arrangements are known in the art. For example, U.S. Pat. Nos. 5,425,513, 6,427,839, 2005/0263087, 2009/0266853, 2011/0132952, and 2011/0272442 all related to some form of bag dispensing.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In some aspects, the techniques described herein relate to a bag-dispensing system including: a bag-receiving chamber defined inside a hood hinged on a base; and a bag-dispensing mouth configured to allow bag passage therethrough upon a bag removal from inside the chamber.

In some aspects, the techniques described herein relate to a bag-dispensing system including: a resistance-imposing subsystem at the mouth imposing a force resisting passage upon a user pulling a bag through the mouth.

In some aspects, the techniques described herein relate to a bag-dispensing system wherein the resistance-imposing subsystem includes an upper flexible resistance-administering member and a lower flexible resistance-administering member, the upper and lower flexible resistance-administering members defining the mouth and being compressed together to create resistance to pulling bags out of the chamber through the mouth.

In some aspects, the techniques described herein relate to a bag-dispensing system wherein the resistance-imposing subsystem includes a user-activated cam that rotates to impart compression between the upper flexible resistance-administering member against the lower flexible resistance-administering member.

In some aspects, the techniques described herein relate to a bag-dispensing system wherein the user-activated cam bears down on a drive bar, the drive bar creating compression in one or more springs locating between the guide bar and a biased bar, the biased bar being operatively connected to press down in the upper resistance-administering member to create the imparted compression.

In some aspects, the techniques described herein relate to a bag-dispensing system wherein the one or more springs are guided on one or more bolts, the one or more bolts each passing through the drive bar and being secured into the biased bar thus allowing the one or more springs to compress.

In some aspects, the techniques described herein relate to a bag-dispensing system including: a knob operatively connected to the user-activated cam; the user-activated cam being located inside the hood; a face having an external front side and an internal backside, the face being presented by the hood, the axle extending through an aperture in the face to operatively connect the knob with the user-activated cam.

In some aspects, the techniques described herein relate to a bag-dispensing system including: a pin extending forward from the cam towards the internal backside of the face; a plurality of boreholes in the internal backside of the face; a biasing system configured to compel the cam toward the internal backside of the face presented by the hood; a plurality of boreholes made through the face, each of the boreholes in the plurality being at different angular positions, and upon receipt of the pin, resulting in a particular level of resistance being administered upon the removal of a bag.

In some aspects, the techniques described herein relate to a bag-dispensing system wherein the knob includes a pointer and the external front side of the face includes a dial displaying a plurality of indicators, each of the plurality of indicators representing a placement of the pin into a particular borehole in the plurality of boreholes.

In some aspects, the techniques described herein relate to a bag-dispensing system wherein the dial includes a neutral indication resulting in the particular borehole the pin is received in resulting in the upper flexible resistance-administering member and the lower flexible resistance-administering member being released from compression.

In some aspects, the techniques described herein relate to a bag-dispensing system wherein the cam is configured to increase radial displacement to engage with and drive a mechanical system to increase the compression between the upper and lower resistance-administering members.

In some aspects, the techniques described herein relate to a bag-dispensing system wherein the cam has an edge which includes a gradually ramped up portion which increases the cam radius to cause the mechanical system to increase the compression between the upper and lower resistance-administering members.

In some aspects, the techniques described herein relate to a bag-dispensing system wherein the cam has a generally flat edge portion which when in engagement with a bar component of the mechanical system results in a minimal displacement resulting in a neutral state which releases all compression imparted to the upper and lower resistance-administering members.

In some aspects, the techniques described herein relate to a bag-dispensing system wherein the cam is locked into different radial positions using a pin.

In some aspects, the techniques described herein relate to the bag-dispensing system of 1 wherein a mount is provided onto which one or both of the hood and base can be received and secured, the mount including a fastening system configured to allow for attachment to a structure.

In some aspects, the techniques described herein relate to the bag-dispensing system of 15 wherein the mount includes apertures for the receipt of fasteners for securement into the structure.

In some aspects, the techniques described herein relate to the bag-dispensing system of 15 wherein the mount cooperates with the base to establish apertures at each end of the system, the apertures configured to receive a belt used to secure the system to a trash container.

In some aspects, the techniques described herein relate to a bag-dispenser wherein the mount establishes an upper shelf configuration which is configured for receipt underneath a receiving canopy of the base.

In some aspects, the techniques described herein relate to a bag-dispensing system including: a container; a bag-dispensing mouth established at a front of the container; a knob outside the container; an axle connecting the knob to a cam inside the container; the cam having a profile configured to create linear motion of a drive member used to create compression used as resistance against removal of a bag from the mouth of the container.

In some aspects, the techniques described herein relate to an article-dispensing system including: a hood hinged to a base to establish a container for a plurality of articles; an article-dispensing opening established at a front of the container; a cam configured to be rotated by a knob from outside the container, the cam having a profile configured to push a mechanical system to create varying levels of resistance against removal of an article from the opening; a surface outside the container behind the knob; a plurality of indications on the surface, each indication in the plurality relating to one of a plurality of angular positions of the cam; a locking pin on the cam, the locking pin receivable into any of a plurality of bore holes associated with the container, each of the plurality of the bore holes upon receiving the locking pin, securing the cam in one of the plurality of angular positions.

BRIEF DESCRIPTION OF THE SEVERAL VIEWS OF THE DRAWINGS

Illustrative embodiments are described in detail below with reference to the attached drawing figures, which are incorporated by reference herein and wherein.

Figure 1:
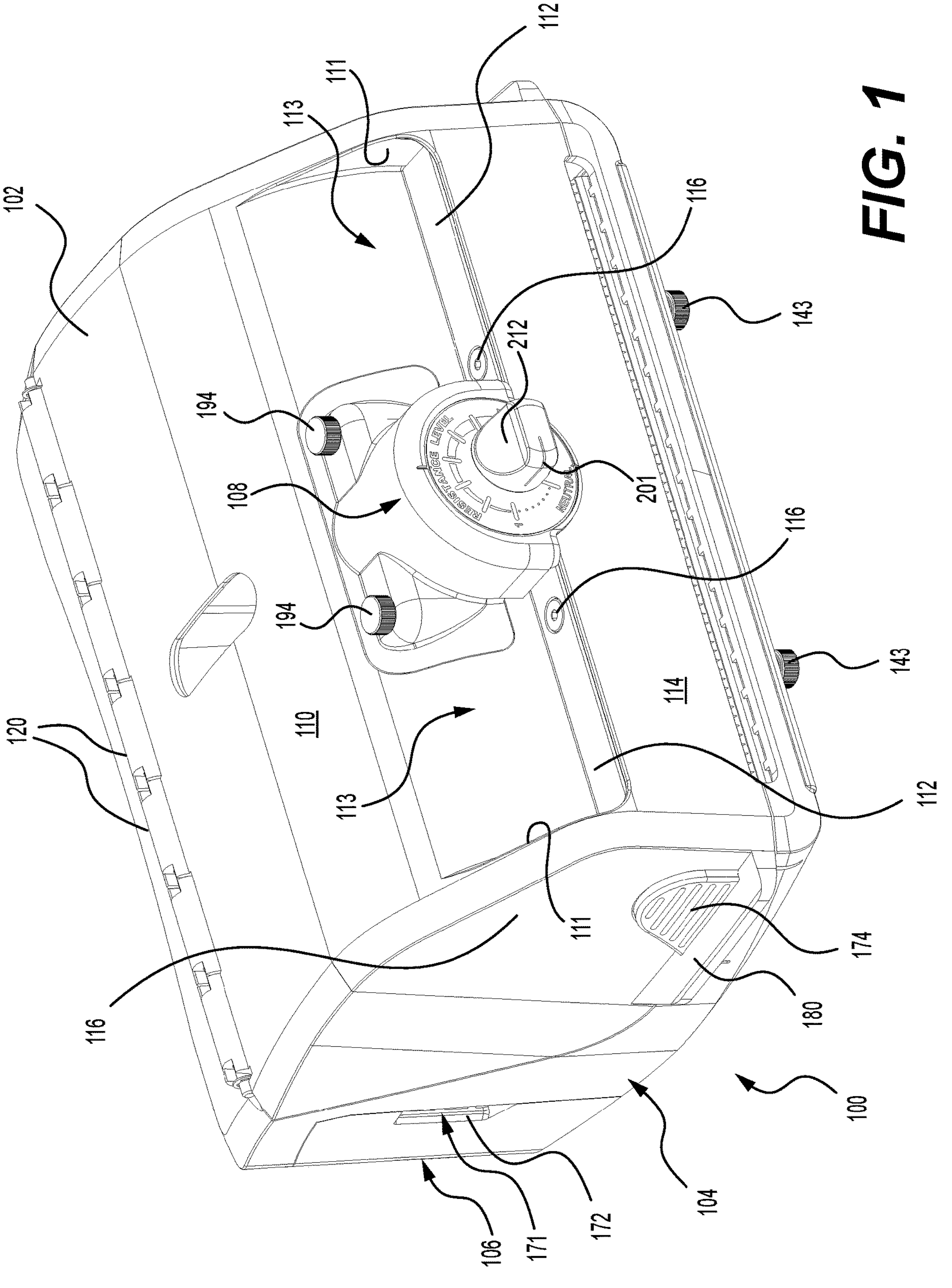
FIG. 1 is a front left perspective view of the dispenser in a closed mode.

An Appendix A has been provided for the purpose of introducing further illustrations and labeling.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to “one embodiment,” “an embodiment,” or “embodiments” mean that the feature or features being referred to are included in at least one embodiment of the technology. Separate references to “one embodiment,” “an embodiment,” or “embodiments” in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Figure 2:
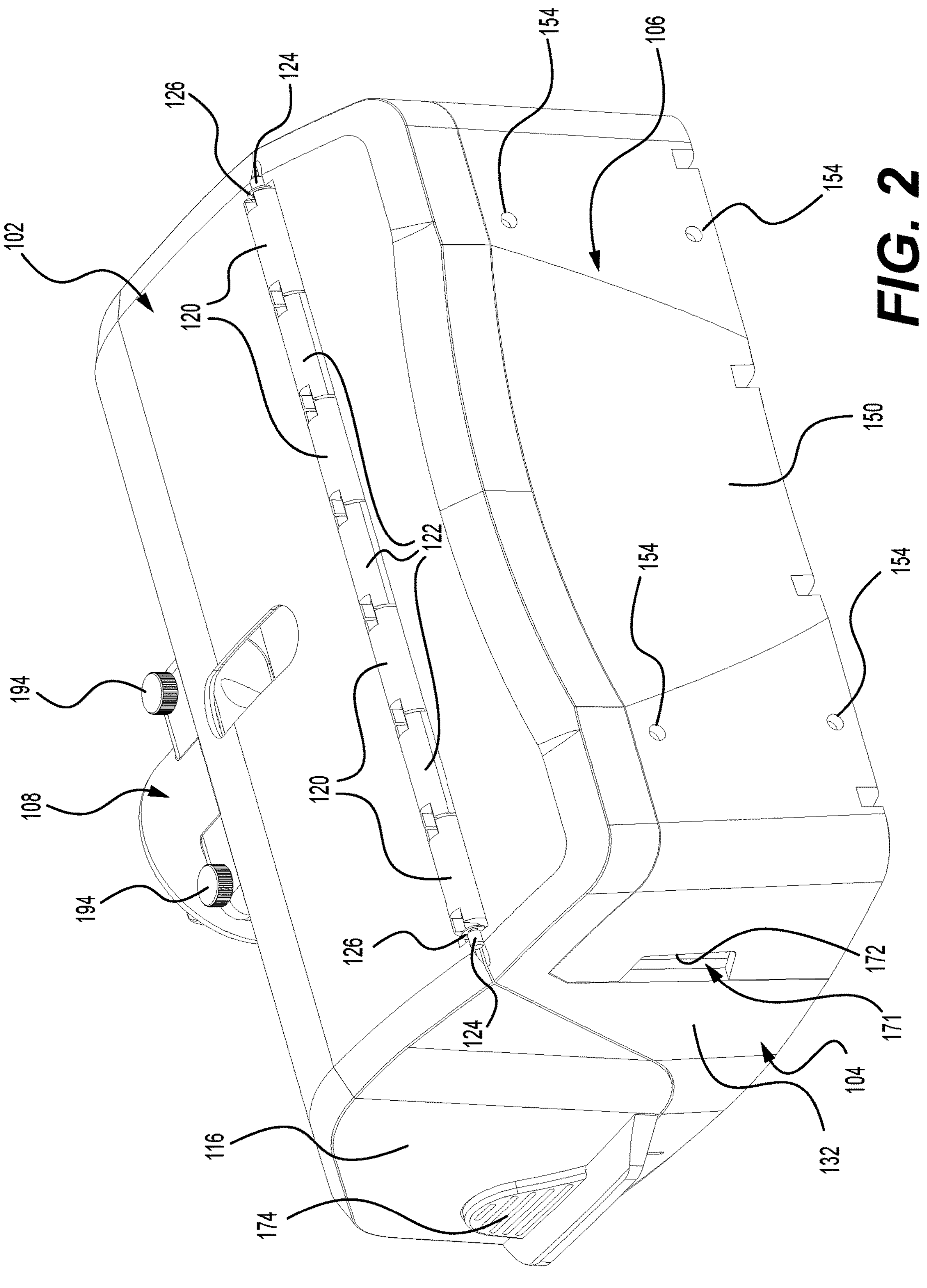
FIG. 2 is a rear right perspective view of the system shown in FIG. 1.
Figure 3:
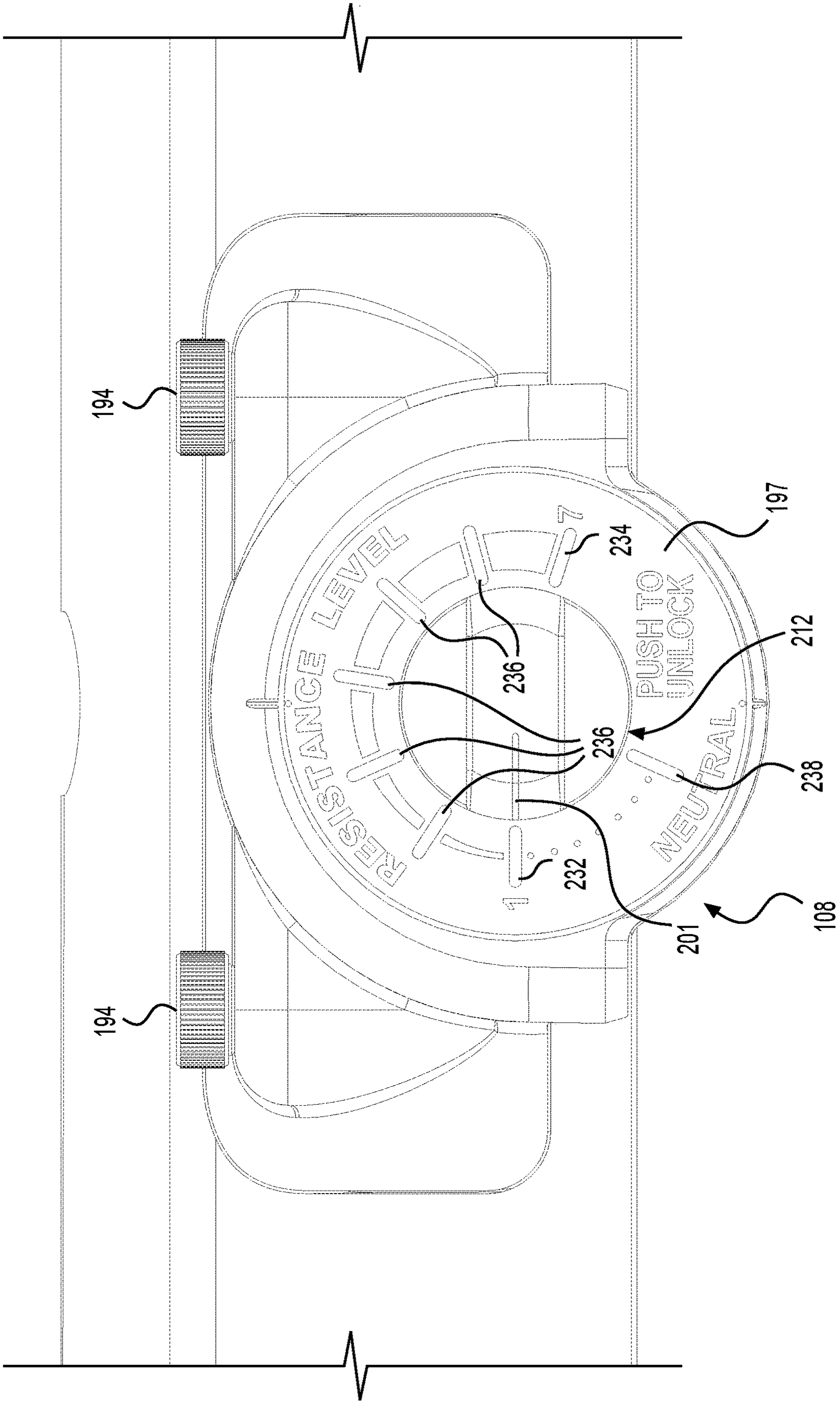
FIG. 3 is a front view showing the indicator dial of the system.
Figure 4:
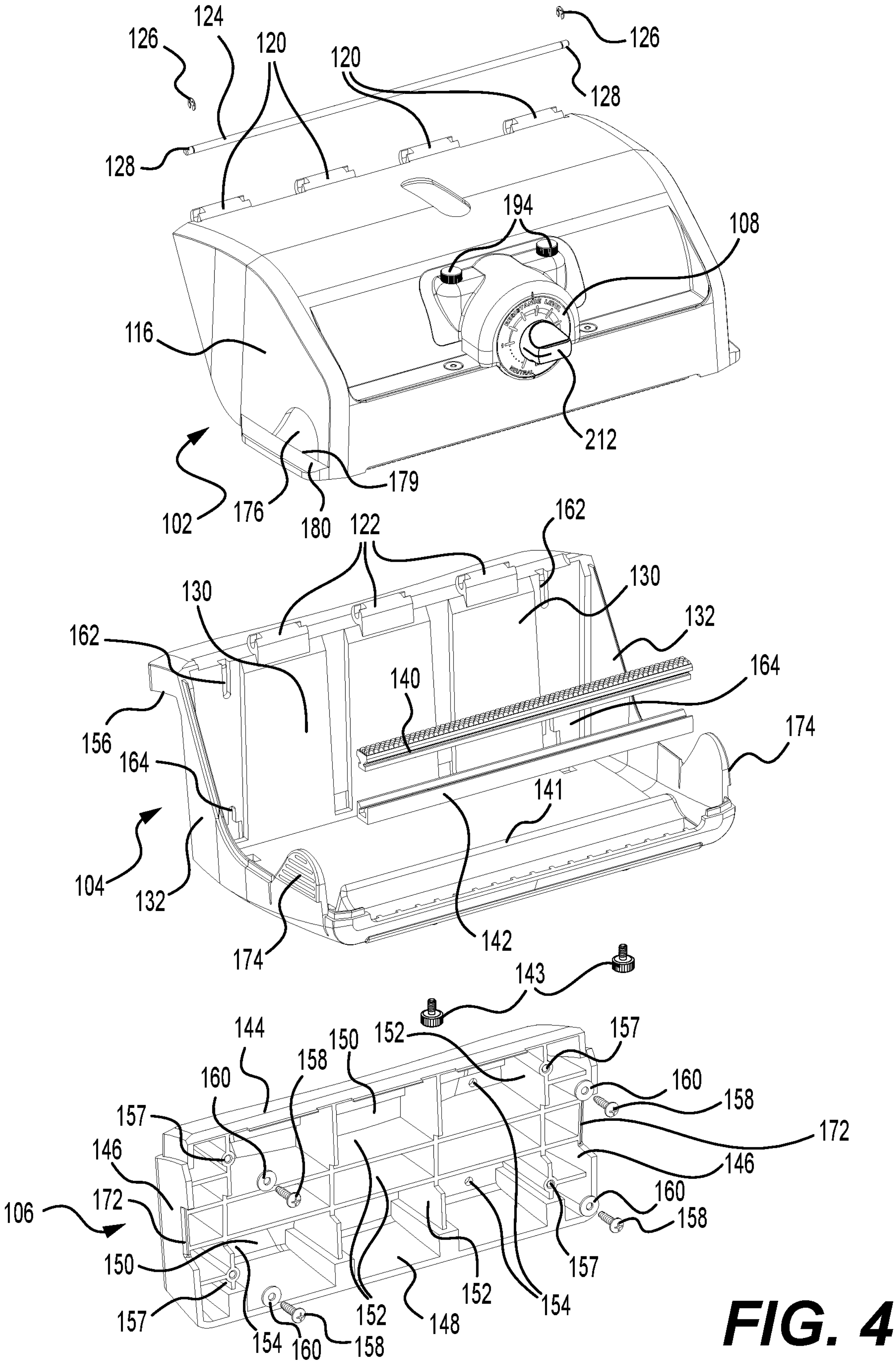
FIG. 4 is an exploded view showing the base, hood, and mount components.

Embodiments provide systems and a method for dispensing bags. FIGS. 1-11 reveal a system embodiment 100. Referring to FIGS. 1-2 and 4, the system, in embodiments, includes a hood 102, a base 104, a mount 106, and a resistance control knob assembly 108. The hood 102 and the base 104 together create a container establishing the mouth 106 at the front from which bags will be dispensed in a clam-shell arrangement.

Hood 102

Figure 6:
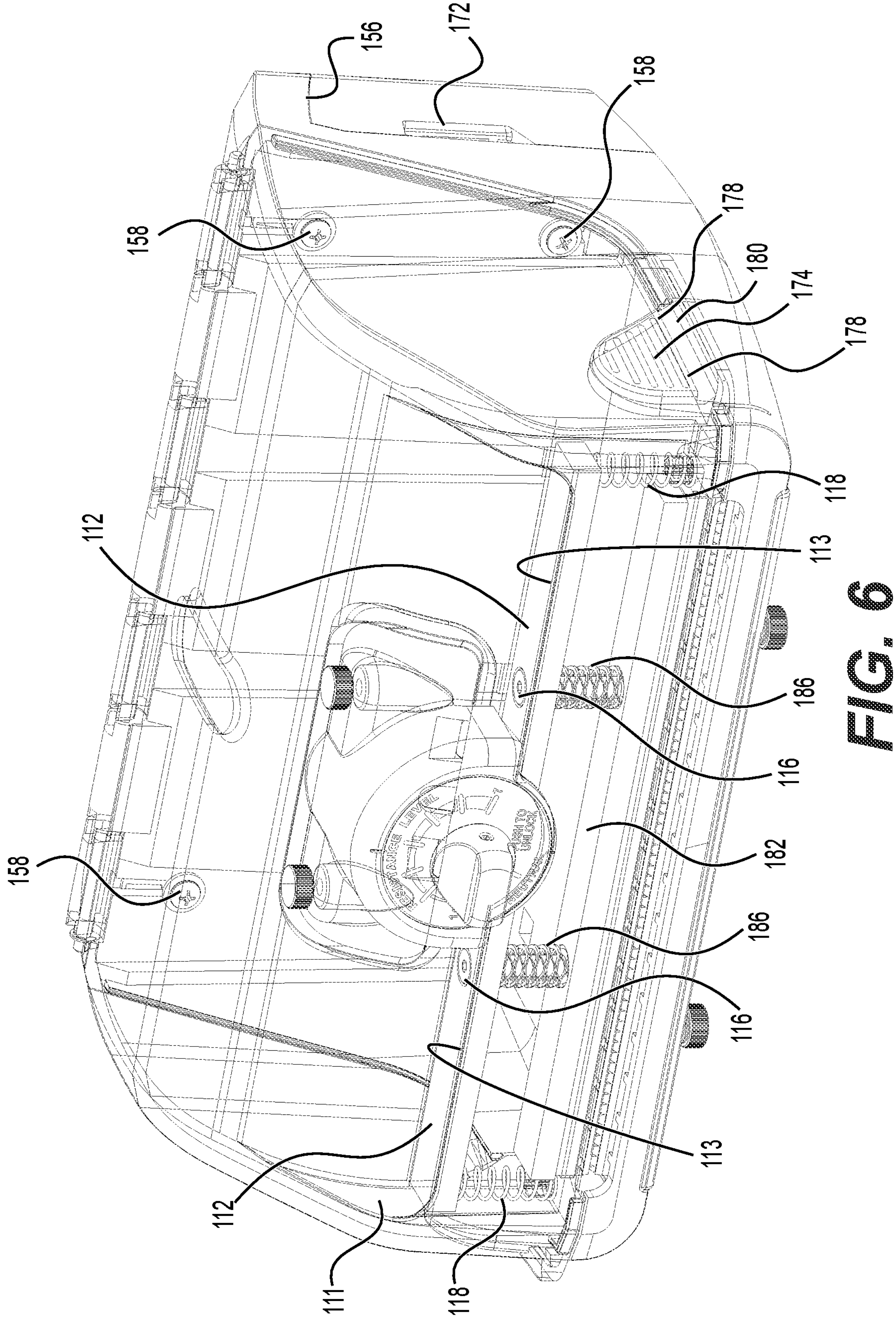
FIG. 6 is a front right view of the system in closed mode with exterior structures ghosted to reveal internal structures.
Figure 7:
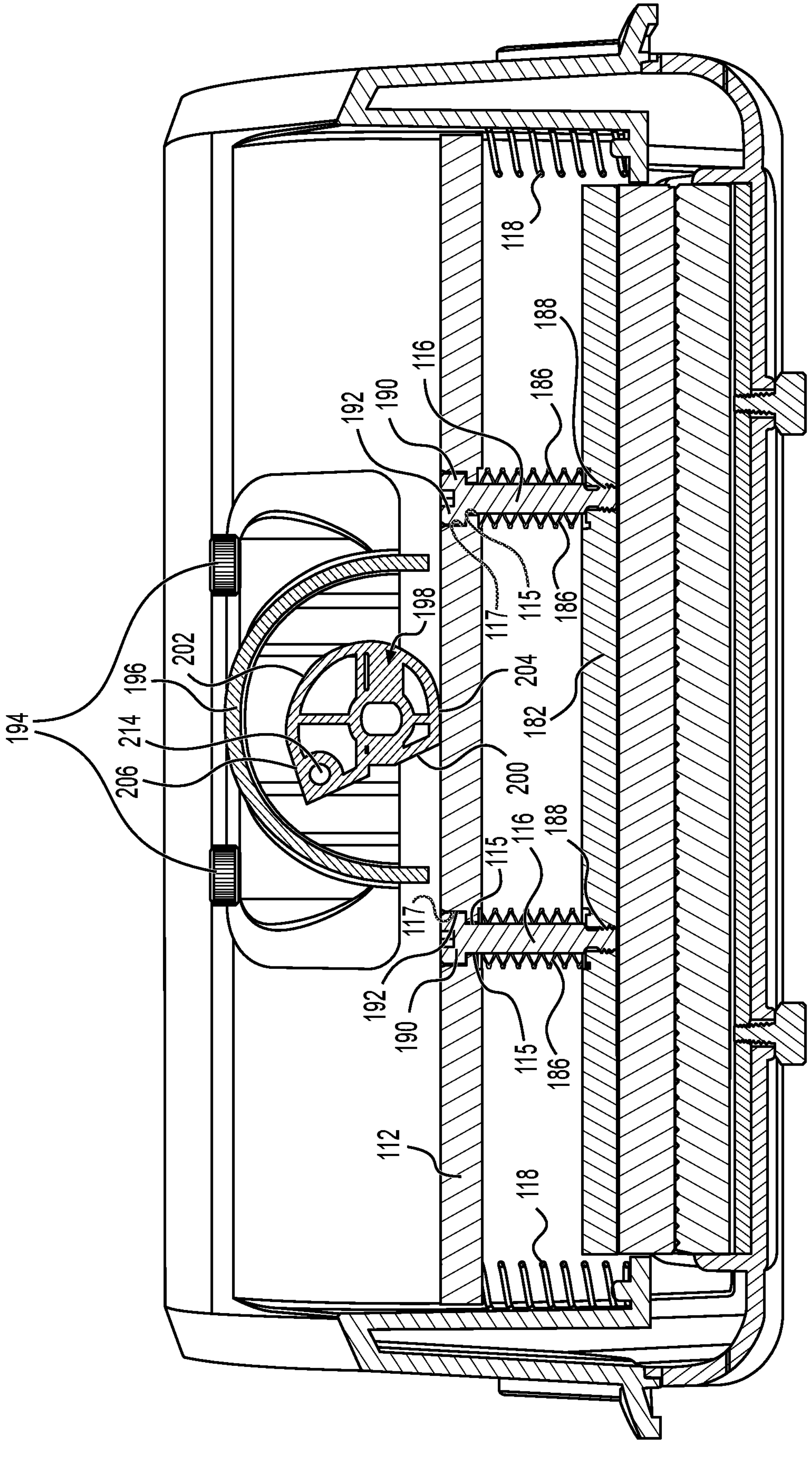
FIG. 7 is a front breakout cross-sectional view of the system revealing internals.

Hood 102 includes a downwardly curved front portion 110 and a drops down into a recessed ledge area 113 defined from below by a drive bar 112, and on the sides by a pair of opposing laterally symmetrical side walls 111. Drive bar 112 is supported in a bar-receiving rectangular recess 113 (see FIGS. 6 and 8) defined into a downwardly-extending front face portion 114 of the hood 110. Twin bolt posts 116 are received through downwardly-extending bores 115 (see FIG. 7) made vertically through the drive bar 112 on opposite sides of the resistance/unlock button assembly 108 (FIG. 1) and the heads 190 of bolt posts 116 are received and restrained by a larger diameter section 117 (FIG. 7).

A pair of vertical compression springs 118 are each mounted on a bottom end by the upper surface located near the mouth of the base 104, and at an upper end underneath the outermost undersurfaces of the drive bar 112. These springs bias the mouth open, but as will be discussed hereinafter, the mouth is normally latched shut during normal use. The springs 118 are located laterally outside the drive bar 112 and the bar 118 so as to not interfere with operations.

A plurality of rod-receiving spaced-apart hinge sections 120 (FIG. 2) are aligned atop the hood 110, and cooperate with an opposing set of aligned hinge sections 122 on the base 104 to receive a rod 124 (see FIGS. 2 and 4). A pair of snap rings 126 are received into annular grooves 128 (FIG. 4) at each end of the rod 124 to secure the rod inside the cylindrical space created through the mated hinge portions 120 and 122, thus hingably securing the hood 102 to the base 104 as can be seen in FIGS. 1 and 2. This hinged relationship supports both a closed mode wherein the hood 110 is closed (See FIG. 1) and an open mode wherein the hood 110 is open (see FIG. 4).

Base 104

Figure 5:
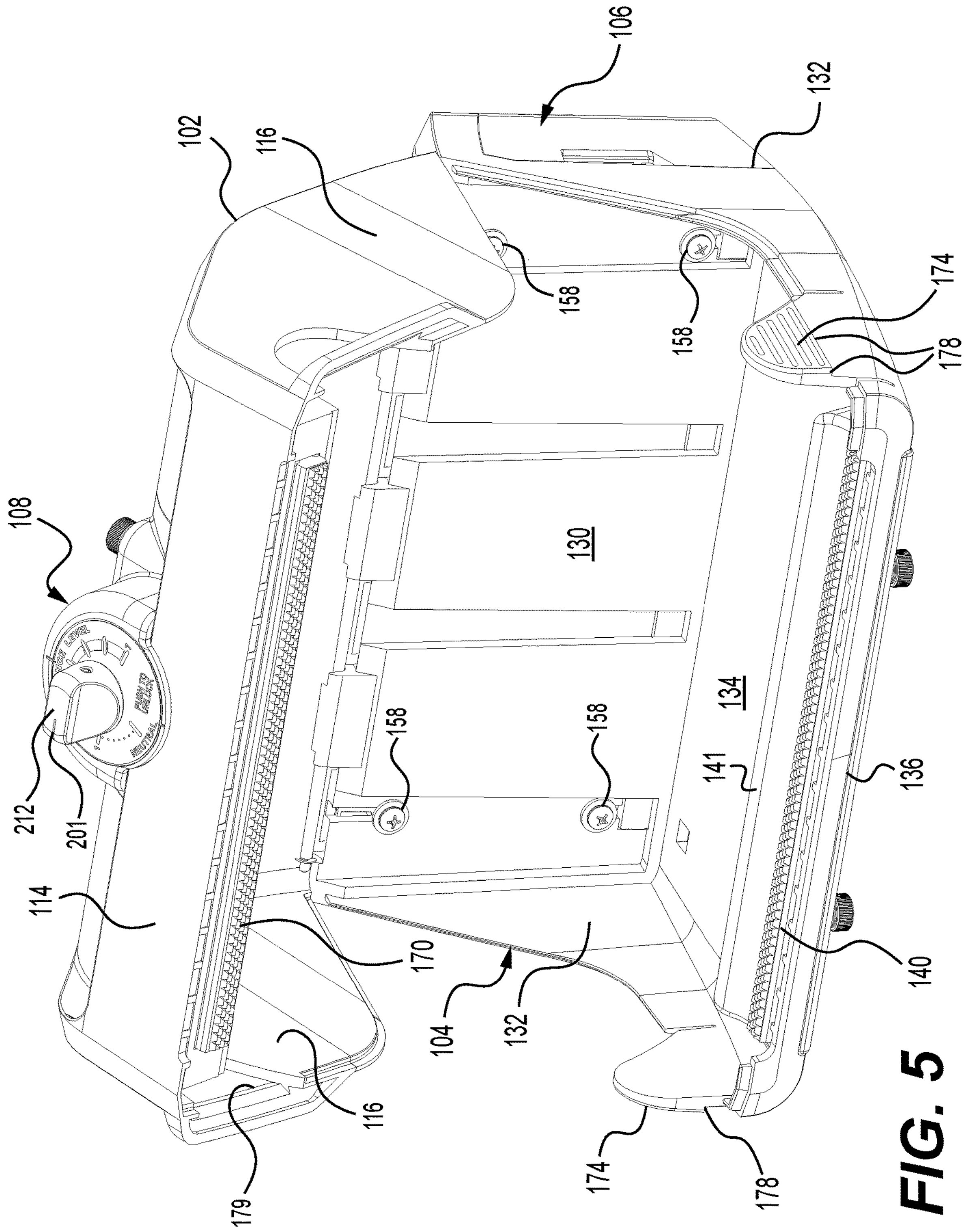
FIG. 5 is a front right perspective view showing the system in an open mode.
Figure 8:
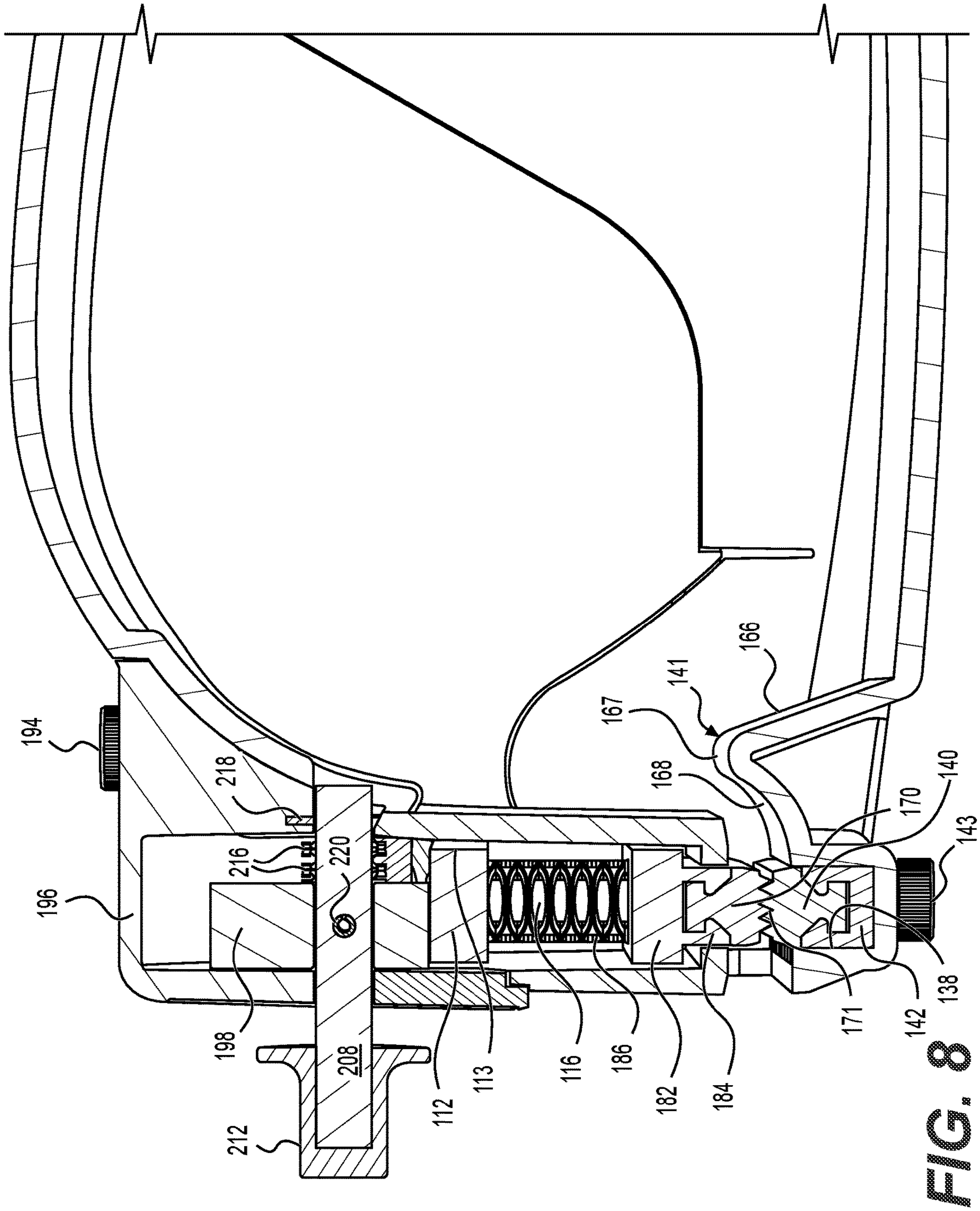
FIG. 8 is a cross-sectional view taken from a transverse plane at a longitudinal center of the device.

Base 104 further includes a slightly backwardly angled, vertically corrugated back wall 130 (FIG. 4), and two partial sidewalls 132, each symmetrical to the other (crosswise) and each configured to receive from above a corresponding shape existing in the hood side walls 116 (FIG. 5). The base 104 also includes a floor portion 134 which extends forward to a lower lip 136. Lower lip 136 includes an elongated rectangular channel 138 (see FIG. 8) having closed ends. Channel 138 receives a lower flexible resistance-administering member 140, or in other words, a brake pad, which is longitudinally pressed into and thus secured within an elongated rigid securing clip 142. The brake 140 and clip 142 are secured into the channel 138 as shown in FIGS. 5, 6, and 8.

Internally, a bag-path deviating riser 141 extends laterally to the extent of and is immediately behind the lower member 140. A cross section of riser 141 can be seen in FIG. 8 wherein it can be observed that the riser includes a rearmost dramatically upwardly angled face 166, then reaches an apex 167, and then makes an arcuate drop towards the front along an arcuate surface 168. As bags are dispensed from the system 100, they will slide over the riser 141 before reaching the closed mouth defined between the upper and lower flexible brake pad members 170 and 140 (see FIG. 8). Additionally, the roll of bags in the device, when being unraveled, will be constrained against moving too far towards the mouth between the brakes 140 and 170 by a counter engagement by the opposing face 166.

A balance between dispensability and resistance offered is struck by opposing interlocking ridges 171 and 141 (see FIG. 8) defined into the inside lips of the opposing brake pad members 170 and 140. The ridges provide grip, but also allow sufficient passage of the bags during dispensing.

The base is made more sound by a pair of screw-in cylindrical plastic/rubber thumb screw base levelers 143 (see FIGS. 1 and 4). The levelers create the ability for the base 104 and thus the overall device 100 to be made level on a resting surface and not slide appreciably.

Mount 106

Back supporting mount 106 includes an upper shelf top 144, side walls 146, and a bottom shelf 148 at the margins of a back wall 150 (see FIG. 4). The back wall 150 includes cross-support members 152 which reinforce between the walls 146 and the upper and lower shelves 144 and 148. A plurality of fasteners (not shown) will be driven through a plurality of apertures (four apertures 154 are shown in the FIG. 4 embodiment) to secure the mount 106 to a receiving surface on a mobile or stationary structure (e.g., waste vessel). As an alternative way to attach the mount 106 to a structure other than driving screws through the holes 154 in the back side 150, a pair of notches 172 (see FIGS. 1 and 2) have been defined into each opposing side of the mount 106 such that the mount can be secured to an object. The notches 172 can receive a belt or strap therethrough so that the device 100 can be secured to a garbage vessel or some other structure. Once the base 104 is received onto the mount 106, the notches will be closed off to form apertures 171 (see FIGS. 1 and 2) for the receipt of a belt (not shown).

The upper shelf configuration 144 of the mount 106 is configured for receipt underneath a receiving canopy 156 of the base 104 (FIG. 4) which extends outwardly and then downwardly to enable the base 132 to be received onto and rest on the mount 106.

In order to fix the base 132 onto the mount 106, screws 158 (each having a washer 160) can be first received through upper apertures 162 made through the upper portion of wall 130, and slide on openings 164 located on the lower portion of wall 130. The screws 158 are received into receiving bores 157 defined into the internal mount structures. Thus, assuming the mount 106 has be initially secured to some supporting surface (e.g., a waste vessel or building structure), the base 104 and hood 102 assembly can easily be attached and removed if needed.

Latching

To secure the fully assembled system 100 in the first mode (as shown in FIG. 1) where the hood 102 is closed, and transition to the second mode where hood is unlatched and raised (see FIG. 5), a pair of press-in latches 174 are provided on the base for the purpose of, e.g., installing a new roll of bags. The laterally opposing latches 174 on each side of the hood 102 can be seen in FIGS. 4 and 6, and are received into reciprocating apertures 179 formed in the hood 102. The bases of the latches 174 each essentially function as levers, in that due to material flexibility they are each bendable inward. If the hood is closed as shown in FIG. 1, a user can simply push inward on the latches 174 enabling both latches to be received inwardly through corresponding removed sections 176 on the hood. When this occurs, outwardly extending projections 178 (FIG. 5) on each latch 174, clear and are released from an upper surface 179 of an outwardly-extending shelf portion 180 enclosing and underneath each removed section 176. The hood 102 will then spring up due to the bias towards an open position compelled by springs 118. The release enables the hood 102 to be moved up into an open mode reflected in FIG. 5. Relatching occurs when the hood is pushed back down with a force sufficient to overcome the counterforce applied by the compressed springs 118 returning the hood to the position shown in FIG. 1. More specifically, the protrusions 178 will snap back out over the upper surface of the shelf 180, thus latching the hood 102 in closed position until such a time the latches 174 are again pressed in to create a release.

Loading

The opening up of the hood 102 enables a roll of bags to be loaded into the system 100. Preferably the unrolling required during dispensing will occur from the top of the roll, and a first bag of the roll brought between the upper and lower brakes 170 and 140, and then the hood closed to clamp the first bag in place between the brakes. Ordinarily the user pulls the bags in the roll out one at a time, and tears each off for use.

Resistance System

The tension between the brakes 170 and 140 is delivered by compression created, and also made to be adjustable (using systems shown primarily in FIGS. 6-8 and 11) so that bag dispensing is optimized. (e.g., so that certain bag types in a roll can be held and torn from one another). To create compression, the upper resilient member/brake 170 is supported beneath a biased bar member 182. The brake 170 is installed into an integrally formed securing carrier clip arms 184 of clip 182 formed underneath the bar 182. More specifically, one end of the resilient member 170 installed into an end of the carrier clip 182, and then the member 170 is pushed inside the clip 182 until it reaches the end of the clip.

Figure 12A:
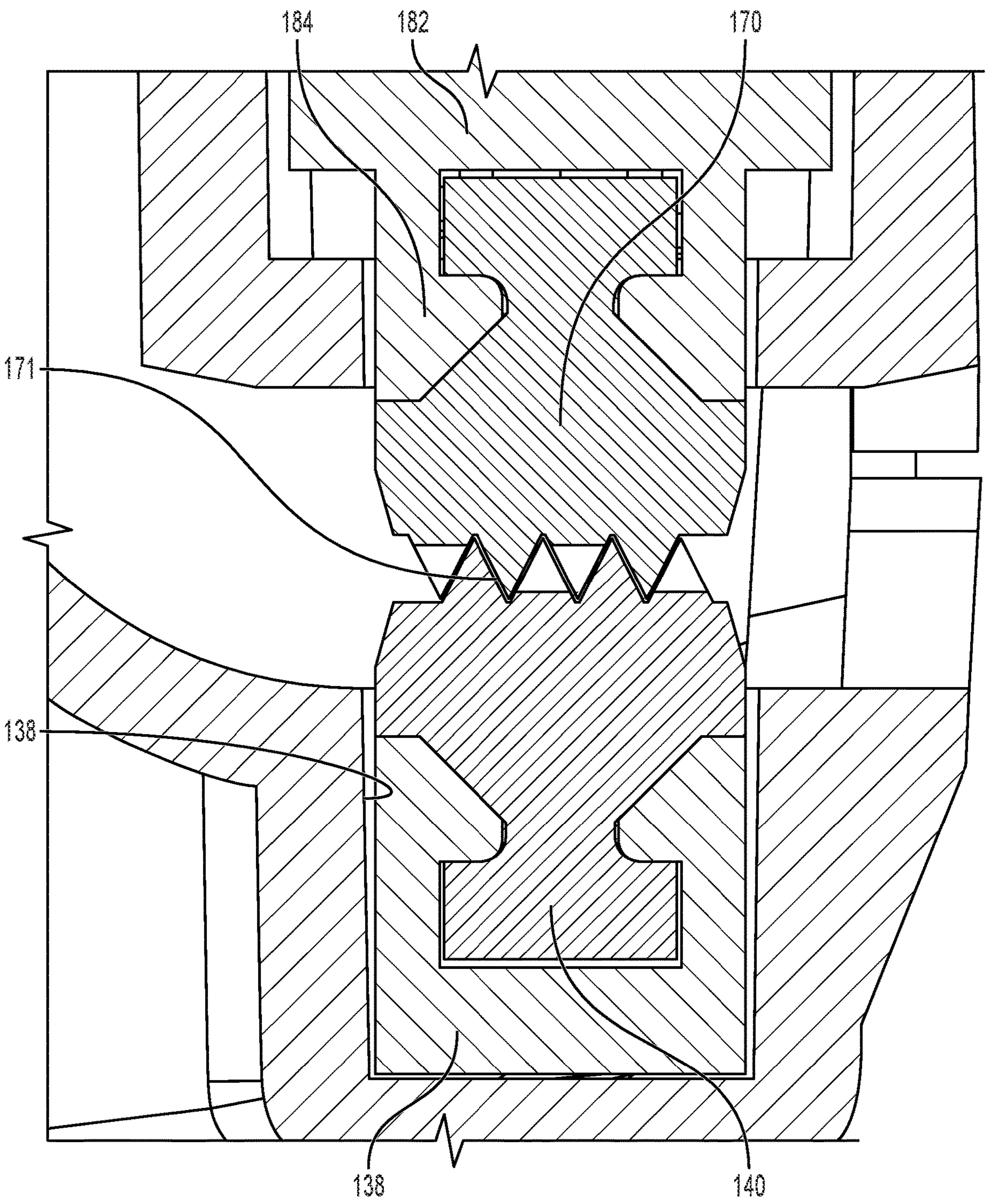
FIGS. 12A and 12B show cross sectional views of opposing flexible resistance-administering members in mated and pointed modes.
Figure 12B:
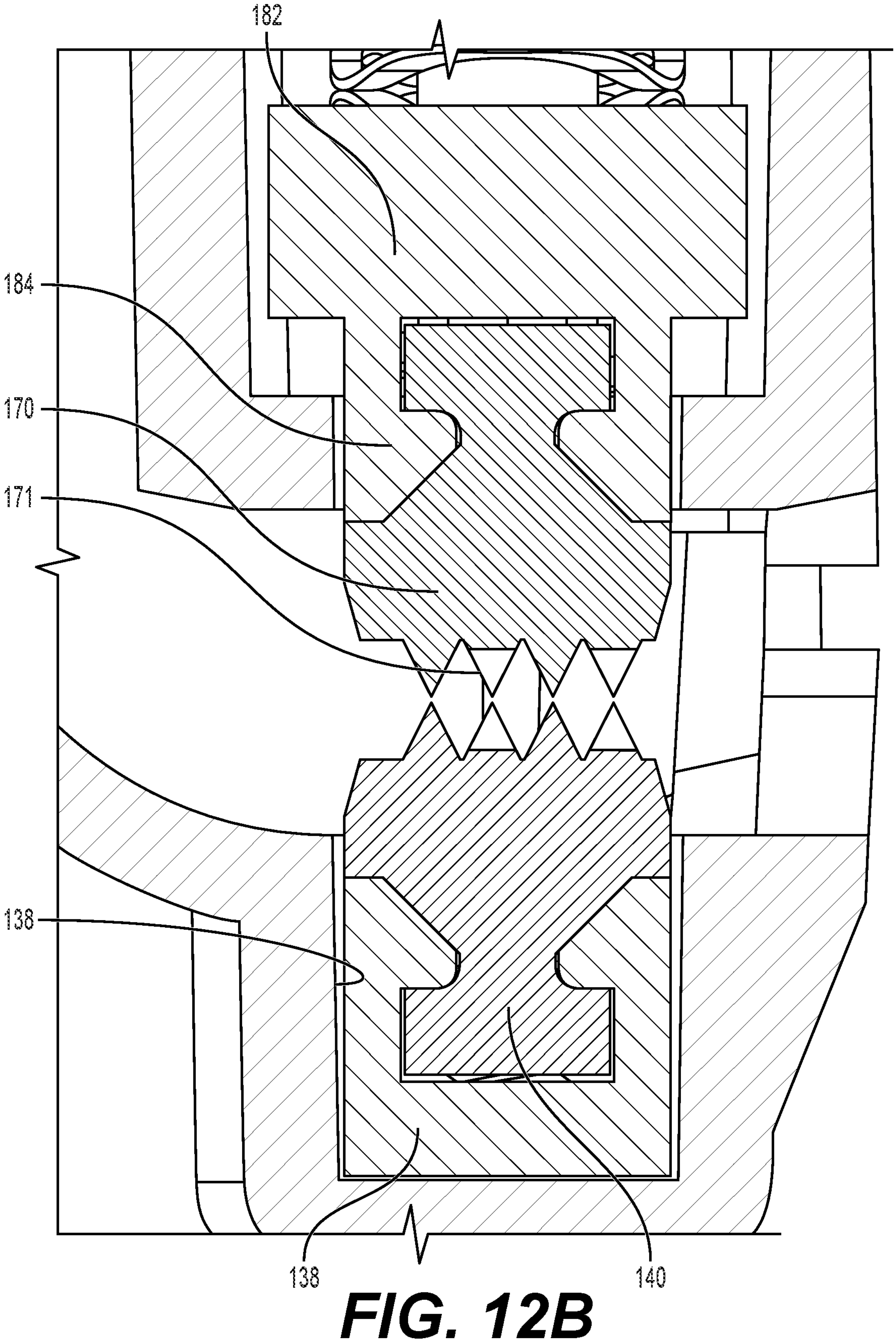

In embodiments, The upper resilient member can be configured to be reversible to create engagement differences between the upper and lower resilient members 140 and 170. To enable this (see FIGS. 12A and 12B), the teeth 1202 on the upper member resilient member 170 are configured such that a different engagement relationship with the teeth 1204 on the lower resilient engagement member 140 is created. In a first interlocking mode seen in FIG. 12A, the engagement is such that each tooth in the set of teeth 1202 on the upper member 170 is received between each tooth in the set of teeth 1204 on the lower member 140. To enter into a second point-to-point mode seen in FIG. 12B, the resilient member 170 can be reinstalled in reverse the clip 182, which causes each tooth in the upper set of teeth 1202 to be reoriented such that the teeth sit point-to-point relative to each of the opposing teeth 1204. The first interlocking mode provides stronger grip for certain applications, whereas the point-to-point mode allows for easier bag pass through.

Biased bar member 182 is biased by tandem compression springs 186. Each of compression springs 186 are cylindrically mounted outside on one of the twin bolt posts 116 such that the tops of each spring 186 bear upward against the bottom surface of the drive bar 112, which moves up or down on the posts 116 inside the bar-receiving rectangular vertical recess 113 (see FIGS. 6 and 8) formed in the base 104. The bottom of each of springs 186 bears downward against the upper surface of biased bar 182. FIG. 7 reveals that each bolt post 116 is secured (via threads 188) into mating internally threaded receptacles formed into the top of the biased bar 182. The heads 190 of each bolt post 116 are loosely held within respective cylindrical bores 192 made machined about half way down into the top of drive bar 112. The resulting assembly enables the drive bar 112 to be able to be driven downward thus increasing the compression force existing in springs 186. This compression is made to be selectable, and will be used to determine the resistance offered by the brakes 140 and 170.

Cam Assembly/Setting Resistance

The resistance offered by the opposing lower and upper brakes 140 and 170 is set by the control knob arrangement 108, which is bolted onto the downwardly curved front portion 110 of the hood 102 using two bolts 194. The heads of the bolts 194 are shown in FIG. 1. They are each fastened by nuts (not shown) that are each secured underneath the hood 102. The knob arrangement 108 is used to selectively set the drive bar 112 at different vertical positions, which results in different levels of compression in the springs 186.

Figure 9:
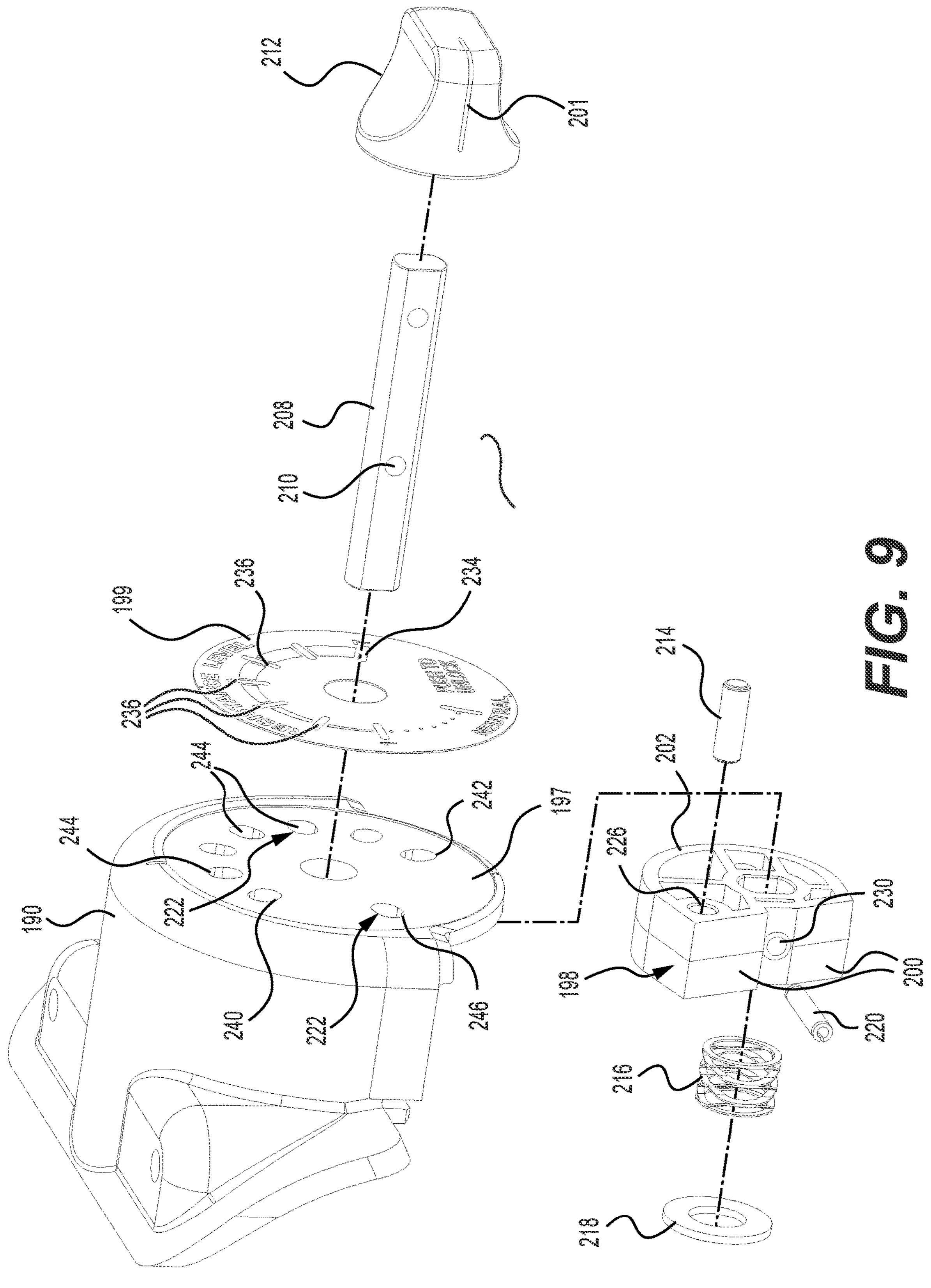
FIG. 9 is an exploded view showing the dial, cam, and shroud of the system in detail.

FIGS. 7-9 show the details for assembly 108. Referring first to FIG. 9, it can be seen that the assembly includes a shroud 196 which conceals a cam 198 from view. The shroud 196 includes a forward face 197 on which a dial 199 (FIG. 9) is mounted. Forward face 197 also includes a plurality of bore apertures 222 each of which can be used to receive a single locating pin 214 from behind, as will be discussed hereinafter.

Rotation created in a knob 212 is imparted to the other mechanics by rotating axle 208. Axle 208 has an irregularly shaped cross section which is consistent along it's length. More specifically, the axle 208 is an elongated member having flat sides and arcuate top and bottom (all when viewed in cross section at any point along the length of the axle 208). The axle 208 also includes a crosswise aperture 210 which will be used to receive a compression pin 220 for assembly. The knob 212 is engaged by a user in selecting a resistance setting using indicator markings 224 made to exist on the dial 199.

In terms of assembly (see FIG. 9), the axle 208 is inserted through an identically-cross-sectioned aperture 213 (flat sides and arcuate top and bottom) made through the center of cam 198. Thus, the cam 198 is slid onto the axle 208 to the point of the crosswise bore 210, matching it up with a corresponding bore 230 made through the cam, both which, when aligned, receive the pin 220. The completed assembly after pushing the pin 220 through bore 230 and then through crosswise bore 210 in the axle locks the cam 198 against rotation on the axle 208.

Figure 10:
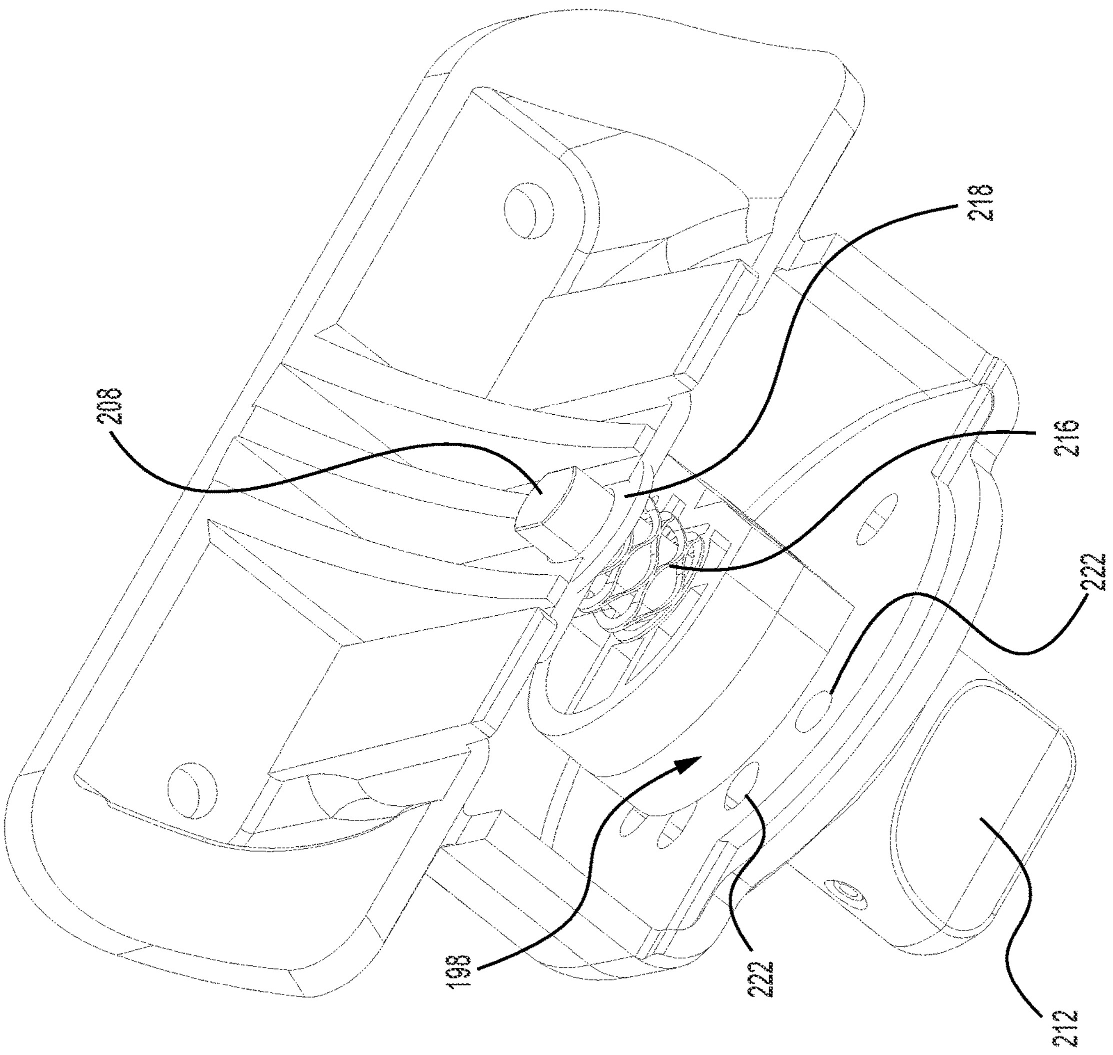
FIG. 10 shows a view from below the dial, cam, shroud assembly.
Figure 11:
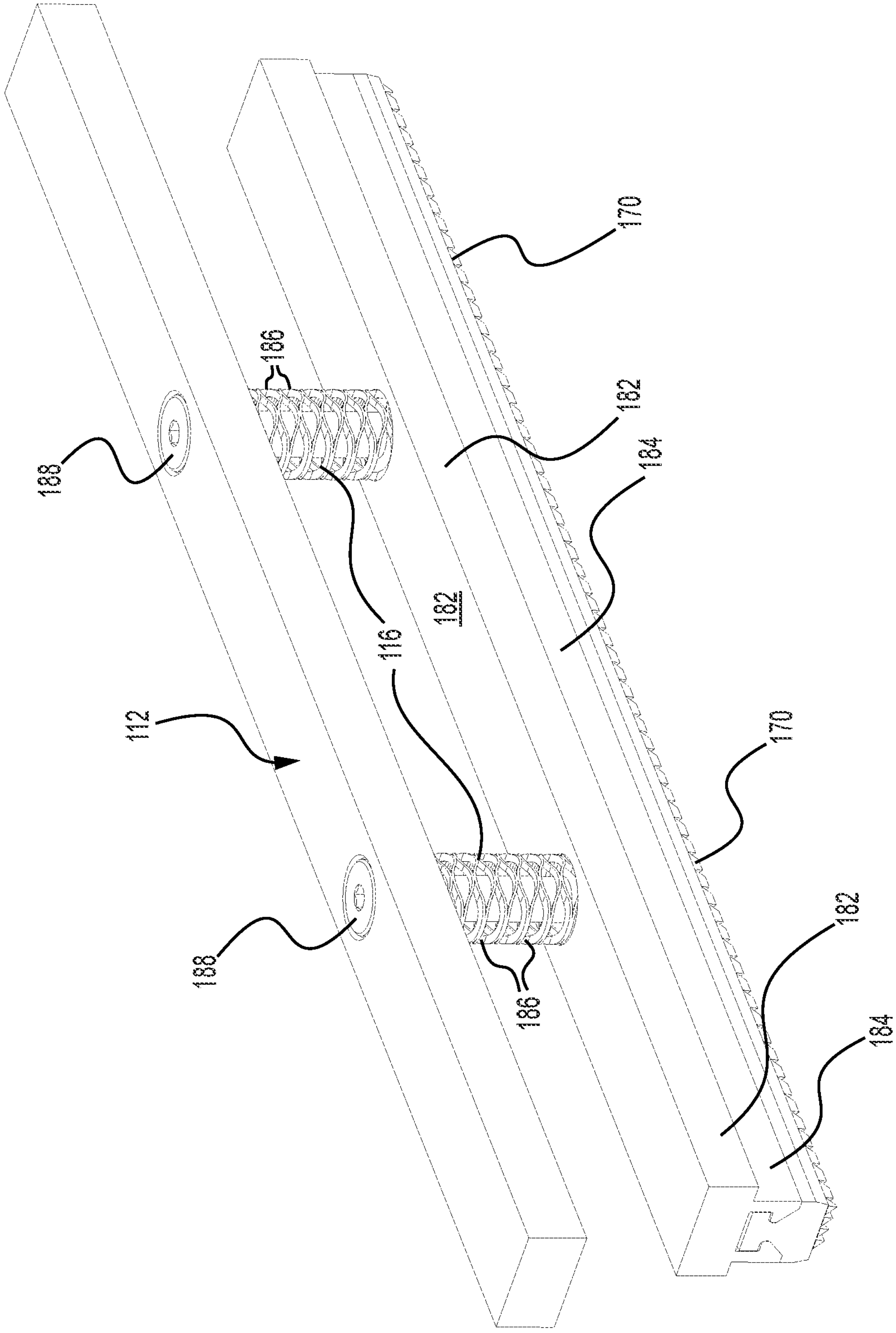
FIG. 11 shows the drive and resistance implementing bar assembly removed from the rest of the system.

The locating pin 214 is then pressed into (and fixed inside) an aperture 226 on the forward side of the cam 198 as can be seen in FIG. 9. The forward end of pin 214, after the press fit, will protrude outward. This protruded portion will be received into the bore apertures 222 in the face 197 from the back upon a depression (pushing in) of the knob 212, enabling rotation of the cam inside the shroud. A cam-biasing system, e.g., a spring 216, as well as a washer 218 are placed on the back (internal) side of the axle 208 as shown in FIG. 9. The cam-biasing spring 216 is placed into compression when it is installed, thus biasing the cam 198 and also knob 212 outward (as seen in FIGS. 8 and 10). For a user to make a resistance setting, this outwardly biasing force must be overcome by the user pushing in on the knob 212 to release the pin 214 from the bore hole (of the plurality of bore holes 222) the pin happens to be in. An R-value of the spring has been selected which provides ample compression to compel the cam outward, while at the same time being easy for a typical user to overcome and push the knob 212 in. Once the pin 214 clears the constraints of the bored hole it happens to be in, the knob 212 (and thus cam 198) can be rotated so that the pin 214 can find a new hole position. More specifically, the pin 214, once moved to a new angular position, and that position is identified by an indicator mark (of marks 224), a release of pressure on the know can cause (due to the bias provided by spring 216) can release the pin 214 (from behind) into the particular hole (of bore holes 222; eight are shown in the embodiments of FIG. 9) the pin 214 is currently aligned with.

After installation on the axle 208, the rotatable cam 198 is configured to bear down on the top of the middle of drive bar 112 to a variety of levels. The extent that the drive bar 112 is moved downward is dependent on the radial position of the cam 198 (e.g., in a cam-follower relationship, in embodiments). Thus, the drive bar 112 acts as a follower relative to the to the cam 198. This cam/follower system causes the drive bar 112 to respond to the profiled shape of the cam periphery (thus, translating the rotation of the cam 198 into the linear downward motion of the drive bar 112.).

The cam 198 profile is configured to be diverse when viewed in cross section (see FIG. 7). Cam 198 has a generally flat (truncated) portion 200 which, when caused to engage the drive bar 112, results in the least radial displacement of any of the other cam rotational positions. An engagement by this long flat cam portion for engagement is used to create a neutral state. More specifically, the neutral state releases all tension imparted to the brakes 140 and 170.

Other peripheral features of the cam 198 include a gradually ramped up edge 202 portion, which increases the cam radius at the point of engagement assuming rotation in a clockwise direction (see FIG. 7). More specifically, the edge 202 begins with an initial edge portion 204 where the displacement radius is larger than for the neutral state, but is still relatively small. Position 204 is, however, still large enough to create a light engagement of the brakes 140 and 170. Further clockwise rotation can continue through numerous intermediate radial displacements, and ending with an edge portion 206 where the radial displacement is maximized. Thus, the more clockwise the cam 198 is rotated using knob 212, the greater the displacement downward of drive bar 112. This results in increased compression in springs 186 as the cam 198 is rotated clockwise, which will gradually increase the resistance offered to bags being dispensed that is created by the upper and lower brakes 170 and 140. Conversely, counter-clockwise rotation of cam 198 will elevate the drive bar 112, thus decreasing the compression in the springs 186 lessening the resistance created in the brakes 170 and 140, then ending in the neutral state where the brakes are no longer engaged.

Overall Functionality/Dial Settings

The system 100 including a selection knob 212 rotatable to accomplish a neutral setting, as well as a variety of increasing or decreasing resistance settings in the brakes 170 and 140 enables a worker to install bags with greater efficiency, and also affords the system to accommodate a variety of rolled bag types. For example, some commercially available rolled trash bags are physically integrated one with the next, but perforated and thus can be torn apart along perforation lines. Other kinds of rolled bags are not integral with one another, but rolled together such that one bag end slightly overlaps the next bag. The overlap is made to an extend that one bag can be dispensed at a time. The disclosed system 100 is able to dispense any of these sorts of bags through the selection of an appropriate dial selection (made using knob 212). In embodiments, the dial can be labeled with bag types to aid the worker is selecting a resistance setting.

Nonperforated bags, during dispensing, merely need unrolling, and thus, require nominal or zero resistance force. Thus, moving the knob to an indication 238 results in a neutral setting where the resistance in the brakes 140 and 170 is minimized the extent that they separate will be the most appropriate for dispensing nonperforated bags. In terms of what is happening behind the dial, a setting of pin 214 into hole 246 will result in this desired neutral setting where the brakes 140 and 170 are open slightly.

Perforated bags, however, require a tear off force. Although there are numerous kinds of perforated bag rolls on the market that function in the same general manner, each of these individual bag types can require different optimal tear-off force levels. To handle this, a multiplicity of resistance levels are offered to a user, made selectable using a pointer 201 on knob 212 at any one of a plurality of radiating indicators existing on (on dial 199). The selection made will depend on the particular type of bag being used. Looking at the details in FIG. 3, the plurality of radiating indications on dial 197 include a first lowest setting indicator 232, five intermediate independent indications 236, and a highest resistance setting indication 234. All of these radiating indications, upon a selection made by aligning the pointer 201, corresponds with a particular hole (of the plurality of bore holes 222) the locating pin 214 is currently being or has been received in after making a depression of the knob 212 and releasing.

Referring to the view of FIG. 9, a location of the pin 214 in a first hole 240 will be the result of a knob position at indication 232 (see FIG. 3), and result in a cam outer surface engagement resulting in minimal resistance. A location of pin 214 in hole 242 will be the result of an indication 234 setting (and result in maximum resistance). Thus, each of the pin locations in between will be representative of different intermediate resistance settings. Because there are seven different resistance level settings, instructions to consumers can be offered where a known bag type is matched with a numbered indicator setting, ensuring optimal use. Alternatively or additionally, actual indicia reflective of a particular bag type could be included on the dial itself at different locations, in addition to, or instead of the setting indicators shown.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A bag-dispensing system for a roll of bags, the system comprising:

- a bag-receiving chamber defined inside a hood hinged on a base; and
- a bag-dispensing mouth configured to allow bag passage therethrough upon a bag removal from inside the chamber;
- a resistance-imposing subsystem imposing a force resisting passage from the mouth wherein the resistance-imposing subsystem includes an upper flexible resistance-administering member and a lower flexible resistance-administering member, the upper and lower flexible resistance-administering members defining the mouth and being configured to, upon an actuation, immediately compress together securing the bag while maintaining the integrity of a portion of the bag in the mouth such that an already dispensed bag can be torn from the roll;
- the resistance-imposing subsystem further comprising a user-activated cam that rotates to impart compression between the upper flexible resistance-administering member against the lower flexible resistance-administering member;
- a knob operatively connected to the user-activated cam;
- the user-activated cam being located inside the hood;
- a face having an external front side and an internal backside, the face being presented by the hood;
- an axle extending through an aperture in the face to operatively connect the knob with the user-activated cam;
- a pin extending forward from the user-activated cam towards an internal backside of the face presented by the hood;
- a biasing system configured to compel the user-activated cam toward the internal backside of the face presented by the hood; and a plurality of boreholes made through the face, each of the boreholes in the plurality being at different angular positions, and upon receipt of the pin, resulting in a particular level of resistance being administered upon the removal of a bag.

2. The bag-dispensing system of claim 1 wherein the user-activated cam bears down on a drive bar, the drive bar creating compression in one or more springs located between the drive bar and a biased bar, the biased bar being operatively connected to press down in the upper resistance-administering member to create the imparted compression.

3. The bag-dispensing system of claim 2 wherein the one or more springs are guided on one or more bolts, the one or more bolts each passing through the drive bar and being secured into the biased bar thus allowing the one or more springs to compress.

4. The bag-dispensing system of claim 1 wherein the knob operatively connected to the user-activated cam includes a pointer and the external front side of the face includes a dial displaying a plurality of indicators, each of the plurality of indicators representing a placement of the pin into a particular borehole in the plurality of boreholes.

5. The bag-dispensing system of claim 4 wherein the dial includes a neutral indication resulting in the particular borehole the pin is received in resulting in the upper flexible resistance-administering member and the lower flexible resistance-administering member being released from compression.

6. The bag-dispensing system of claim 1 wherein the cam is configured to increase radial displacement to engage with and drive a mechanical system to increase the compression between the upper and lower resistance-administering members.

7. The bag-dispensing system of claim 6 wherein the cam has an edge which includes a gradually ramped up portion which increases the cam radius to cause the mechanical system to increase the compression between the upper and lower resistance-administering members.

8. The bag-dispensing system of claim 7 wherein the cam has a generally flat edge portion which when in engagement with a drive bar included in a bar component of the mechanical system results in a minimal displacement resulting in a neutral state which releases all compression imparted to the upper and lower resistance-administering members.

9. The bag-dispensing system of claim 1 wherein the cam is locked into different radial positions using the pin.

10. The bag-dispensing system of claim 1 wherein a mount is provided onto which one or both of the hood and base can be received and secured, the mount including a fastening system configured to allow for attachment to a structure.

11. The bag-dispensing system of claim 10 wherein the mount includes apertures for the receipt of fasteners for securement into the structure.

12. The bag-dispensing system of claim 10 wherein the mount cooperates with the base to establish apertures at each end of the system, the apertures configured to receive a belt used to secure the system to a trash container.

13. The bag-dispenser of claim 10 wherein the mount establishes an upper shelf configuration which is configured for receipt underneath a receiving canopy of the base.

14. A bag-dispensing system comprising:

a container;

a bag-dispensing mouth established at a front of the container;

a knob outside the container;

an axle connecting the knob to a cam inside the container;

the cam having a profile configured to create linear motion of a drive member to establish a variety of tear-off force settings for a pair of opposed resilient members used to initially engage opposite sides of a bag and enable a tearing off of an already dispensed bag.

15. An article-dispensing system comprising:

a hood hinged to a base to establish a container for a plurality of articles;

an article-dispensing opening established at a front of the container;

a cam configured to be rotated by a knob from outside the container, the cam having a profile configured to push a mechanical system to create varying levels of resistance against removal of an article from the opening;

a surface outside the container behind the knob;

a plurality of indications on the surface, each indication in the plurality relating to one of a plurality of angular positions of the cam;

a locking pin on the cam, the locking pin receivable into any of a plurality of bore holes associated with the container, each of the plurality of the bore holes upon receiving the locking pin, securing the cam in one of the plurality of angular positions.

* * * * *